July 19, 1955

H. MAGNUSKI 2,713,664

LIMITER FOR PHASE MODULATION

Filed April 2, 1948

INVENTOR.
Henry Magnuski
BY Foorman L. Mueller
Atty.

2,713,664

LIMITER FOR PHASE MODULATION

Henry Magnuski, Chicago, Ill., assignor to Motorola, Inc., Chicago, Ill., a corporation of Illinois Application April 2, 1948, Serial No. 18,633

5 Claims. (Cl. 332—18)

This invention relates generally to systems for limiting the amplitude of audio frequency signals and more particularly to a system for limiting the amplitude of the modulating signal applied to a phase modulation system inversely with the frequency of the signal to prevent over-modulation.

It is standard practice in communication systems to transmit low frequency or audio signals by using such signals to angle modulate a high frequency carrier wave. Such a carrier wave may then be transmitted either over wire lines or by radio. In radio transmission, in order to prevent interference between various communications systems the frequency band must be limited. That is, each communication system must operate within narrow frequency channels so that interference between systems operating on adjacent channels will be prevented. In frequency modulating systems, the deviation of the modulated carrier wave depends only upon the amplitude of the modulating signal and is entirely independent of frequency thereof. Therefore, by limiting the amplitude of the modulating signal, over-modulation can be prevented. However, in other types of modulating systems such as, for example, phase modulating systems, the deviation of the carrier wave varies with the frequency of the modulating signal as well as with the amplitude thereof. For this reason, simple amplitude limiting, which is independent of frequency, will not necessarily prevent over-modulation of the carrier wave. To prevent such over-modulation, it is necessary that the amplitude limits of the modulating signal be different from the various frequency components of the signal. In phase modulating systems, as the deviation varies substantially linear with frequency, it is apparent that a low frequency component may have a relatively high amplitude without causing over-modulation while a very high frequency component, even at relatively low amplitude, may cause over-modulation.

It is, therefore, an object of the present invention to provide a limiter for preventing over-modulation of a carrier wave in a modulating system in which the deviation of the carrier wave varies with the frequency of the modulating wave.

A further object of this invention is to provide a simple audio limiter in which distortion is held to a minimum and the intelligibility of the audio signal is not destroyed.

A feature of this invention is the provision of a system for controlling the gain of a modulating signal inversely with the frequency of the signal.

A further feature is the provision of a system for preventing over-modulation of a phase modulator by providing a control voltage which varies with the frequency of the modulating signal and using such voltage to control the gain of an amplifier which precedes the modulator in the system.

A still further feature of this invention is the provision of a limiter which prevents the amplitude of each frequency component of a signal from exceeding a predetermined maximum value but which does not modify or distort signals having magnitude below said predetermined values.

Further objects, features and advantages will be apparent from a consideration of the following description, taken in connection with the accompanying drawings, in which.

In practicing the invention there is provided a phase modulation system in which an audio or other low frequency modulating signal, having components of various frequencies, is applied to the phase modulator through a variable gain amplifier. The modulating signal is also applied to a controlling amplifier, the output of which varies linearly with frequency. The signals from the controlling amplifier are rectified to provide a direct current control voltage which may be applied to the variable gain amplifier. This control voltage limits the gain of the amplifier in accordance with the frequency of the modulating signal so that a signal applied to the phase modulator is selectively amplified in accordance with the frequency. The controlling amplifier may be operated from the signal after being amplified and arranged so the gain of the amplifier is not effective when the amplified signal is within predetermined limits. In this way, signals which are within the predetermined limits are not modified by the limiter.

Figure 1:
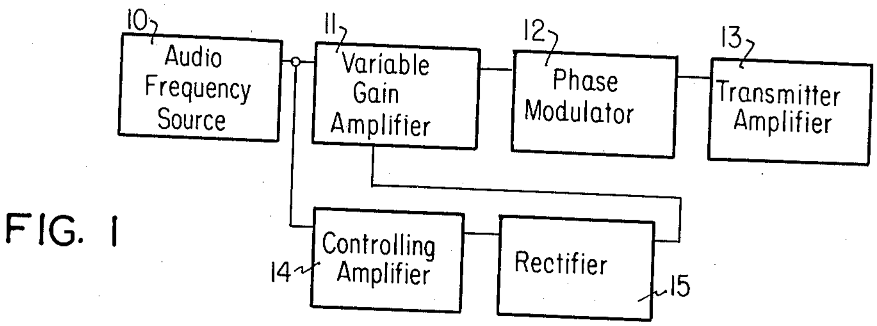
Fig. 1 is a block diagram illustrating the use of the limiter in accordance with the invention in a phase modulation system.

Referring now to the drawings, in Fig. 1 there is illustrated a phase modulating system including an audio frequency source 10, a variable gain amplifier 11, phase modulator 12 and transmitter or power amplifier 13 all connected in cascade. A controlling amplifier 14 also receives the audio frequency signal. The controlling amplifier may be of any construction wherein the output varies substantially linearly with the frequency. The output of the controlling amplifier 14 is applied to rectifier 15 which produces a direct current control voltage which varies linearly with frequency. The control voltage from the rectifier 15 is applied to the variable gain amplifier 11 in such manner that the gain of the amplifier decreases as the magnitude of the control voltage increases. The amplifier, therefore, effectively limits the amplitude of the signal in accordance with the amplitudes of the various frequency components thereof so that the deviation of modulated wave, which depends upon both the amplitude and frequency of the modulating signal, is limited.

Figure 2:
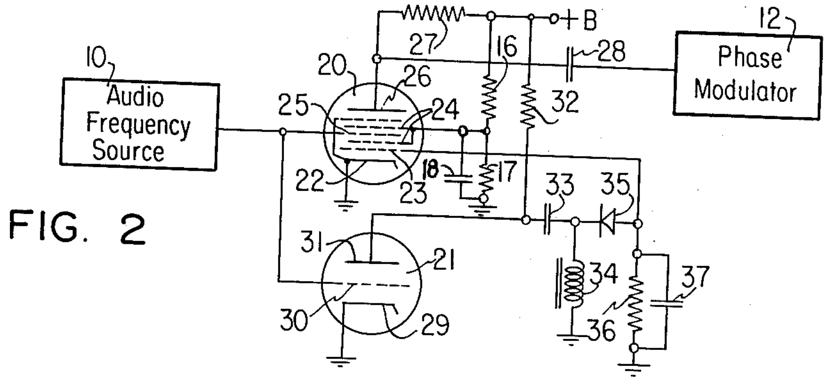
Fig. 2 illustrates one circuit embodiment of the limiter in accordance with the invention.

In Fig. 2 there is illustrated a circuit diagram of a limiting system in accordance with the invention. The audio signal is simultaneously applied to tubes 20 and 21 which form the variable gain amplifier and the controlling amplifier, respectively. Tube 20 which may be type 6L7 includes a cathode 22, a first grid 23 to which the control voltage is fed as will be explained, a second grid 25 to which the audio voltage is applied, screen grids 24 and a plate 26. Operating potential is applied to the plate 26 through resistor 27 and to the screen grids 24 through the voltage divider including resistors 16 and 17. Condenser 18 provides an audio frequency bypass. The amplified audio signal is applied from the plate 26 through blocking condenser 28 to the phase modulator 12. The variable gain amplifier is not frequency selective but increases the amplitude of all frequencies in the signal applied thereto at the same rate, with the rate depending on the amplitude of the control voltage applied thereto.

The controlling amplifier may consist of one or more pentodes or triodes, Fig. 2 showing only one triode 21 having a cathode 29, grid 30 and plate 31. The audio signal is applied to the grid 30 and operating potential is applied through resistor 32 to the plate 31. The amplified signal is applied through blocking condenser 33 to a coil 34 having a high inductance and small resistance. As the reactance of the coil is proportional to frequency, the voltage appearing across the coil will also be proportional to frequency. The voltage across the coil 34 is rectified by rectifier 35 which may be a crystal or a diode, to provide a direct current voltage on resistor 36. Capacitor 37 provides an audio frequency by-pass. As previously stated, the control voltage developed across resistor 36 is applied to the first grid 23 of the variable gain amplifier tube 20. The rectifier 35 is connected so that a negative voltage is applied to the grid 23 and as this voltage increases with frequency, the tube 20 is biased off as the frequency increases so that the gain of the amplifier varies inversely with frequency.

Figure 3:
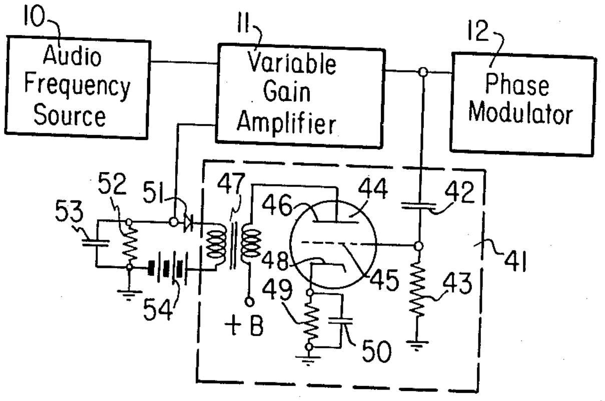
Fig. 3 illustrates a modified system in accordance with the invention.

In Fig. 3 there is disclosed a modified system in which the gain of the amplifier is not altered when the output thereof is within predetermined amplitude and frequency limits. Signals may, therefore, be applied to the controlling amplifier 41 from the output of the variable gain amplifier 11, and may be applied to the frequency sensitive network before or after amplification. The amplifier 41 of Fig. 3 is a variation of the controlling amplifier shown in Fig. 2. The signal is first applied to the frequency sensitive network and then amplified and rectified. The network may consist of capacitor 42 and resistor 43, the latter having a small resistance as compared with the impedance of capacitor 42 for all modulating frequencies. In such a network, the current flowing through capacitor 42 and resistor 43 is essentially proportional to frequency and accordingly the voltage drop across the resistor 43 is also proportional to frequency. This voltage is amplified in tube 44 being applied to the grid 45 thereof. The output of this tube is applied from plate 46 to the primary winding of transformer 47. For applying operating potential to the tube 44, the primary winding is connected to +B potential. The cathode 48 of the tube is biased by resistor 49 which is by-passed by condenser 50. The secondary winding of the transformer 47 is connected in a series circuit including rectifier 51, resistor 52, by-passed by condenser 53, and battery 54. The voltage in the secondary winding is rectified by rectifier 51 and appears across the resistor 52. A bias voltage is applied by battery 54 so that a negative voltage is not produced across the resistor 52 when the output of the amplifier 11 is within certain limits as to amplitude and frequency. However, when the output of the variable gain amplifier 11 exceeds these limits, the voltage across resistor 52 exceeds that of the battery 54 and acts to bias off the variable gain amplifier 11 in the manner previously described with reference to Fig. 2.

Figure 4:
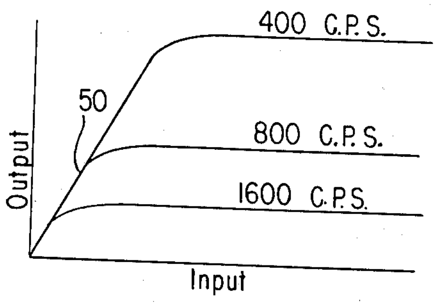
Fig. 4 is a curve chart illustrating operation of the system of Fig. 3.

The operation of a system as shown in Fig. 3 is illustrated by the curves in Fig. 4. As shown by the inclined portion 50, the output of the variable gain amplifier is substantially linear with the input up to predetermined points which depend upon the frequency of the signal. At low frequencies such as 400 cycles per second the linear portion may extend to relatively large outputs before the controlling amplifier reduces the gain of the variable gain amplifier so that it remains substantially level. At higher frequencies the gain is reduced at lower amplitude levels as shown by the curves indicating action at 800 and 1600 cycles per second.

It is seen from the above that there is provided a modulation limiter in which the amplitude of the modulating signal is limited in accordance with the amplitudes of the various frequency components thereof. Therefore, the increased deviation of a phase modulator resulting from modulation by signals of higher frequency is counteracted by reduction of gain of the amplifier and corresponding reduction in the amplitude of the higher frequency signals so that over-modulation is prevented. As the limiter may be made ineffective when the signals are of such level that over-modulation would not be produced so that modification of the signal does not take place except on signals which would normally cause over-modulation. The reduction of the amplitude of the signal is merely enough to prevent over-modulation, and all signals above certain level will modulate the transmitter 100% but without over-modulation. The system disclosed is also quite simple requiring relatively few components all of which are standard.

While I have described certain embodiments of the invention which are illustrative thereof, it is obvious that various changes and modifications can be made therein without departing from the intended scope of the invention as defined by the appended claims.

I claim:

1. A phase modulation transmitter including circuits and apparatus for modulating the phase of alternating current the mean frequency of which is substantially constant, said circuits and apparatus including a phase modulator portion and a path wherein modulation energy flows; a variable gain amplifier in said modulation energy path, said amplifier comprising an electron discharge device with a gain control grid, a cathode and an anode; means for automatically controlling the gain of said amplifier by said modulation energy, said gain being reduced to a greater extent by strong high frequency modulating energy than by strong low frequency modulating energy, said means comprising a rectifier in a rectifier load circuit including a resistor connected between the rectifier anode and cathode, a connection between the rectifier anode end of said resistor and the grid of the amplifier device, a connection between the rectifier cathode end of said resistor and the cathode of the amplifier device, a network which attenuates low modulation frequencies to a greater extent than high modulation frequencies coupled to said rectifier, and means for impressing modulation components on said network; and means connecting said anode of said electron discharge device to said phase modulator portion for applying the controlled output of said device to said modulator portion for phase modulating the alternating current, with the deviation of the modulated current from the mean frequency thereof being limited.

2. A phase modulation transmitter including circuits and apparatus for modulating the phase of alternating current the mean frequency of which is substantially constant, said circuits and apparatus including a phase modulator portion and a path wherein modulation energy flows; a variable gain amplifier in said modulation energy path, said amplifier including an electron discharge device with a gain control grid, a cathode, and an anode; means for automatically controlling the gain of said amplifier by said modulation energy including a rectifier in a rectifier load circuit with load impedance means therein coupled to the rectifier anode and cathode, a network which attenuates low modulation frequencies to a greater extent than high modulation frequencies coupled to said rectifier, means for impressing on said network modulation components from said anode of said electron discharge device of said variable gain amplifier, a connection between the rectifier anode end of said impedance means and the grid of said electron discharge device, and a connection between the rectifier cathode end of said impedance means and the cathode of said electron discharge device, whereby the gain of said amplifier is reduced to a greater extent by strong high frequency modulating energy than by strong low frequency modulating energy; and means connecting said anode of said electron discharge device to said phase modulator portion for applying the controlled output of said device to said modulator portion for phase modulating the alternating current.

with the deviation of the modulated current from the mean frequency thereof being limited.

3. A phase modulation transmitter including circuits and apparatus for modulating the phase of alternating current the mean frequency of which is substantially constant, said circuits and apparatus including a phase modulator portion and a path wherein modulation energy flows; a variable gain amplifier in said modulation energy path including an electron discharge device having a gain control grid, a cathode and an anode, said amplifier having substantially uniform frequency response characteristics and a gain which varies inversely with the amplitude of a negative direct current bias applied to said gain control grid; means for automatically controlling the gain of said amplifier by said modulation energy including circuit means having an input and an output and producing a signal at said output which varies in amplitude substantially linearly with the frequency of the signal applied to the input thereof, means connecting said anode of said discharge device to said input of said circuit means for applying modulation energy thereto, a rectifier circuit connected to said output of said circuit means and including a rectifier having an anode and a cathode, said rectifier circuit including load impedance means and biasing means connected in series relation between said rectifier anode and cathode, said biasing means providing a direct current bias which opposes the rectified voltage so that a direct current voltage is developed across said load impedance means varying directly with the amplitude of the signal applied thereto for signals having amplitudes which exceed said direct current bias, a connection from said gain control grid of said electron discharge device to the end of said load impedance means coupled to said anode of said rectifier, and a connection from the cathode of said electron discharge device to the end of said load impedance means coupled to said cathode of said rectifier, said connections rendering said gain control grid negative with respect to said cathode with said direct current voltage across said load impedance means reducing the gain of said amplifier substantially linearly with the frequency and amplitude of the modulation energy above a predetermined level established by said biasing means; and means connecting said variable gain amplifier to said phase modulator portion for applying the controlled output of said amplifier to said modulator portion for phase modulating the alternating current, with the deviation of the modulated current from the mean frequency thereof being limited by control of the output of said amplifier.

4. A phase modulation transmitter including circuits and apparatus for modulating the phase of alternating current the mean frequency of which is substantially constant, said circuits and apparatus including a phase modulator portion and a path wherein modulation energy flows; a variable gain amplifier in said modulation energy path including an electron device having first and second electrodes, said amplifier having substantially uniform frequency response characteristics and a gain which varies inversely with the amplitude of a direct current bias applied to said electrodes for rendering said first electrode negative with respect to said second electrode, means for automatically controlling the gain of said amplifier by said modulation energy including circuit means having an input and an output and producing a signal at said output which varies in amplitude substantially linearly with the frequency of the signal applied to the input thereof, means for impressing said modulation energy on said input of said circuit means, a rectifier circuit connected to said output of said circuit means and having a rectifier element having anode and cathode electrodes, said rectifier circuit including load impedance means and biasing means connected in series relation between said rectifier electrodes, said biasing means providing a direct current bias which opposes the rectified voltage so that a direct current voltage is developed across said load impedance means varying directly with the amplitude of the signal applied thereto for signals having amplitudes which exceed said direct current bias, connections between said load impedance means and said electrodes of said electron device for applying the direct current voltage across said load impedance means to said device for rendering said first electrode negative with respect to said second electrode, with the direct current voltage reducing the gain of said amplifier substantially linearly with the frequency and amplitude of the modulation energy above a predetermined level established by said biasing means, and means connecting said variable gain amplifier to said phase modulator portion for applying the controlled output of said amplifier to said modulator portion for phase modulating the alternating current, with the deviation of the modulated current from the mean frequency thereof being limited by action of said amplifier.

5. A phase modulation transmitter including circuits and apparatus for modulating the phase of alternating current the mean frequency of which is substantially constant, said circuits and apparatus including a phase modulator portion and a path wherein modulation energy flows; a variable gain amplifier in said modulation energy path including an electron device having first and second electrodes, said amplifier having substantially uniform frequency response characteristics and a gain which varies inversely with the amplitude of a direct current bias applied to said electrodes for rendering said first electrode negative with respect to said second electrode, means for automatically controlling the gain of said amplifier by said modulation energy including circuit means having an input and an output and producing a signal at said output which varies in amplitude substantially linearly with the frequency of the signal applied to the input thereof, means for impressing the modulating energy at the output of said amplifier on said input of said circuit means, a rectifier circuit connected to said output of said circuit means and having a rectifier element having anode and cathode electrodes, said rectifier circuit including load impedance means and biasing means connected in series relation between said rectifier electrodes, said biasing means providing a direct current bias which opposes the rectified voltage so that a direct current voltage is developed across said load impedance means varying directly with the amplitude of the signal applied thereto for signals having amplitudes which exceed said direct current bias, connections between said load impedance means and said electrodes of said electron device for applying the direct current voltage across said load impedance means to said device for rendering said first electrode negative with respect to said second electrode, with the direct current voltage reducing the gain of said amplifier substantially linearly with the frequency and amplitude of the modulation energy above a predetermined level established by said biasing means, and means connecting said variable gain amplifier to said phase modulator portion for applying the controlled output of said amplifier to said modulator portion for phase modulating the alternating current, with the deviation of the modulated current from the mean frequency thereof being limited by the control of said modulation energy.

References Cited in the file of this patent

UNITED STATES PATENTS

| | | |
|---|---|---|
| 1,993,859 | Roberts | Mar. 12, 1935 |
| 2,246,164 | Crosby | June 17, 1941 |
| 2,312,260 | Miller | Feb. 23, 1943 |
| 2,334,726 | Rankin | Nov. 23, 1943 |
| 2,430,978 | Foster | Nov. 18, 1947 |
| 2,469,218 | Thomas | May 3, 1949 |
| 2,606,971 | Scott | Aug. 12, 1952 |